April 9, 1940.                O. RIESTER                2,196,275
                           COLOR PHOTOGRAPHY
                          Filed Nov. 10, 1938 sensitivity of negative film (normal)

absorption of dyes formed from color formers of negative film by development sensitization of positive film                    Filter absorption of dyes formed from color formers of positive film by development Inventor
Oskar Riester
By His Attorneys Patented Apr. 9, 1940

2,196,275

UNITED STATES PATENT OFFICE 2,196,275

COLOR PHOTOGRAPHY

Oskar Riester, Dessau-Ziebigk, Germany, assignor, by mesne assignments, to General Aniline & Film Corporation, New York, N. Y., a corporation of Delaware Application November 10, 1938, Serial No. 239,737
In Germany January 17, 1938

2 Claims. (Cl. 95—2)

The present invention relates to a color photographic process.

It is an object thereof to provide an improved and simplified process for the taking and printing of color pictures which are produced by color forming development. Further objects will become apparent from the description following hereinafter. Reference is made to the accompanying drawing which is self explanatory if read in conjunction with the following detailed specification.

The present invention is based on the observation that it is of advantage to produce a colour negative on a multi-layer film, the layers of which are normally sensitised and colour formers of which are developed to dyestuffs having absorption maxima shifted towards the longer wave lengths, and to use a yellow filter in the printing operation, the printing multi-layer film being so sensitised that the sensitising maxima of the several layers coincide with the absorption maxima of the dyestuffs of the negative copied. In a process thus modified, therefore, it is essential that by use of the yellow filter the blue and violet-sensitivity of the layers of the copying film is excluded. Hitherto, in multi-layer films, especially copying films, it has been necessary to arrange between the first and the second layer a filter layer absorbing all violet and blue light, thus excluding the blue and violet sensitivity of the middle and lower layers. The omission of the yellow filter layer, therefore, constitutes an essential simplification in the production of the multilayer copying film. It is preferable to use as the filter a strong yellow filter, for example the Agfa yellow filter No. 5 with an absorption range below 510 m$\mu$.

Figure 1:
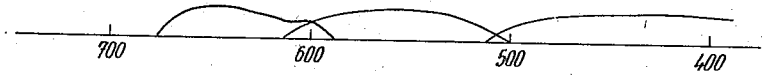
Figure 2:
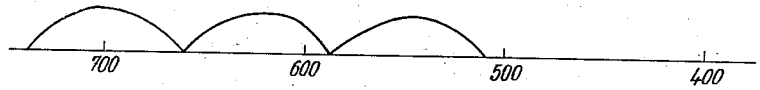

As the master picture a color negative is employed, the colors of which deviate from those complementary to the colors of the object photographed, for example there is used a negative (Figs. 1 and 2) film the topmost layer of which is sensitive to blue and contains a color former for orange-red, while the middle layer is sensitive to green and contains a color former for violet, and the bottom layer is sensitive to red and contains a color former for yellow-green. This film affords a negative in colors of which the absorption maxima are shifted towards the red part of the spectrum.

Figure 3:
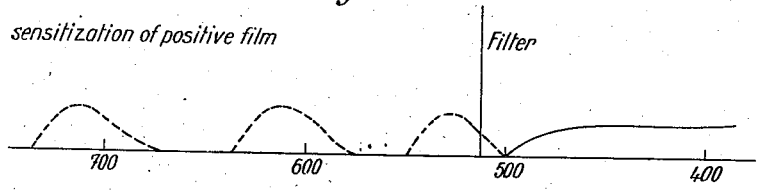
Figure 4:
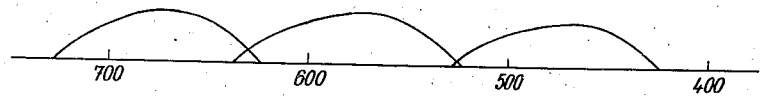

As printing material (Fig. 3 and 4) there is used a multi-layer positive film the layers of which are so sensitised that the sensitising maxima coincide with the absorption maxima for the dyestuffs of the master picture, that is to say with the red, violet and green dyestuffs. The individual layers of the copying film contain dyestuff components which are capable of development to yellow, red and blue-green dyestuffs, so that in the development of the copying film there is obtained a picture in correct colors, for example the topmost layer is green sensitised and provided with a color former for yellow, the middle layer is yellow-red sensitised (maximum about 590–630 m$\mu$) and provided with a color former for red, and the lowest layer is sensitised to a deep red (maximum about 680–730 m$\mu$) and provided with a color former for blue-green.

The layers may obviously be arranged in another order and also the color formers and the sensitisers in the negative film may be exchanged, only in the corresponding positive film there must be corresponding exchange of the sensitivities and color components. Fundamentally, it is even possible to transfer one or even two sensitising maxima of the positive film to the infra-red.

I claim:

1. A process of producing photographic multicolor pictures, which comprises exposing to light controlled by an object to be reproduced a multilayer photographic element, the layers of which are differently color sensitive and comprise layers sensitive to blue, green and red respectively, said layers containing dyestuff components fast to diffusion capable of being developed to dyestuffs, the absorption maxima of which are removed towards the long wave part of the spectrum compared with the maxima of sensitivity of the corresponding layers, developing a negative color picture in said photographic element with a colorforming developer so as to form said dyestuffs, printing through a strong yellow-filter onto a multi-layer printing material sensitized in such a manner that the maxima of sensitivity of the layers are substantially identical with the absorption maxima of the dyes of the corresponding layers of said master picture.

2. The process according to claim 1, wherein a multi-layer element is used as a printing material in which at least one layer has its maximum of sensitivity in the infra-red part of the spectrum.

OSKAR RIESTER.